G. O. CURME, Jr.
ELECTROCHEMICAL METHOD AND APPARATUS OF PRODUCING SYNTHETIC ACETYLENE FROM ORGANIC LIQUID.
APPLICATION FILED JULY 20, 1915. RENEWED JULY 10, 1917.
1,315,540.
Patented Sept. 9, 1919.
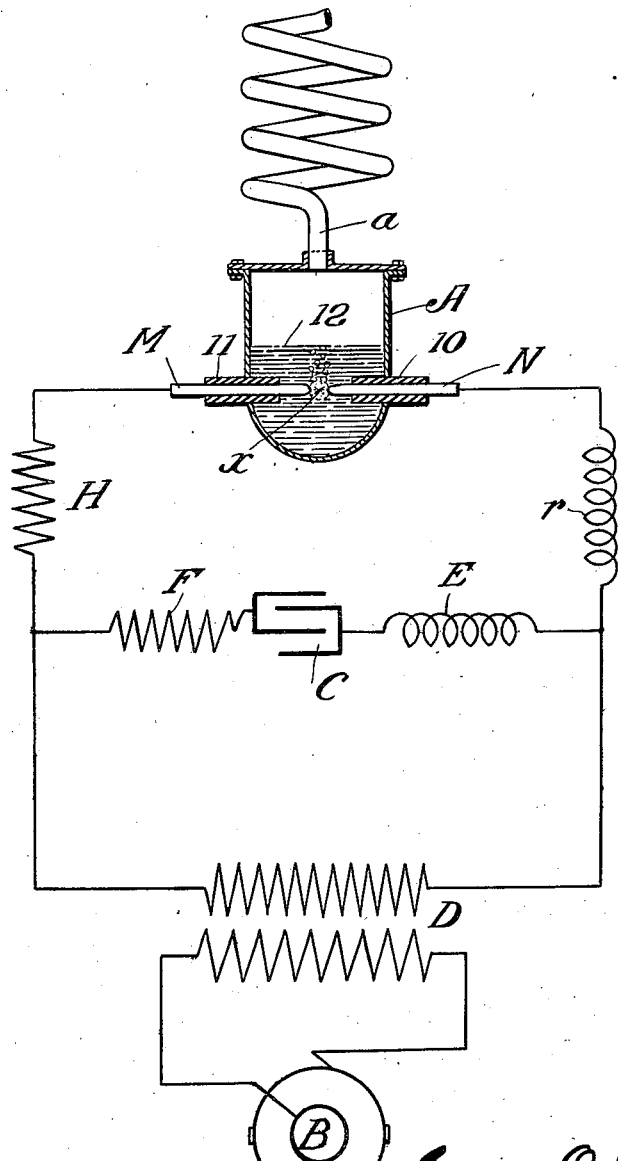

UNITED STATES PATENT OFFICE.

GEORGE O. CURME, JR., OF PITTSBURGH, PENNSYLVANIA, ASSIGNOR, BY MESNE ASSIGNMENTS, TO UNION CARBIDE COMPANY, OF NEW YORK, N. Y., A CORPORATION OF VIRGINIA.

ELECTROCHEMICAL METHOD AND APPARATUS OF PRODUCING SYNTHETIC ACETYLENE FROM ORGANIC LIQUID.

1,315,540.     Specification of Letters Patent.     Patented Sept. 9, 1919.

Application filed July 20, 1915, Serial No. 40,973. Renewed July 10, 1917. Serial No. 179,760½.

*To all whom it may concern:*

Be it known that I, GEORGE O. CURME, Jr., a citizen of the United States, residing at Pittsburgh, Allegheny county, and State of Pennsylvania, have invented and discovered certain new and useful Improvements in Electrochemical Methods and Apparatus of Producing Synthetic Acetylene from Organic Liquid, of which the following is a specification.

I have discovered, by a series of experiments, that certain organic liquids, particularly hydrocarbon liquids, when treated under certain conditions by an electric discharge, are decomposed and the synthesis of acetylene, along with certain other attendant compounds, is brought about.

For the purpose of describing my invention, I have illustrated diagrammatically in the accompanying drawing an apparatus such as I have employed in my experiments. In this drawing the portion marked A represents an electrothermic cell, B the "power house" or source of electric current, such as a dynamo, C an electrical condenser for producing a high frequency discharge, D a transformer interposed between the source of electric current and the cell, F and H resistance, and E and G reactance in the circuit, and M and N carbon electrodes.

The electrothermic cell A has a gas outlet $a$ leading from the upper end thereof to the gas holder (not shown). Said gas outlet is preferably a coil immersed in a cold water tank (not shown) and serves as a condenser for the vaporized liquid, preventing same from passing with the fixed gases to the receiver.

One carbon electrode (or both if preferred) is adjustable to secure the length of discharge gap desired and means for adjusting it can readily be supplied without illustration.

The apparatus thus described will be readily understood and needs no further description, being used chiefly to illustrate an apparatus by which the method which constitutes my said invention may be practised, but it is not intended that it shall be understood as showing the only, or even the best apparatus for the purpose. It is understood, of course, that controlling devices, such as switches, etc., of any appropriate type, will be supplied wherever necessary and that they are not shown for the reason that they will readily suggest themselves to any electrical engineer and will be employed as required to suit the convenient use of any particular apparatus.

In carrying out said method, the apparatus being arranged, as shown, and the electrothermic cell being supplied with organic liquid, such as petroleum hydrocarbons, to a level as at point 12, which completely submerges the electrodes, the electric current is turned on from the source of supply and a discharge produced at X between said electrodes. Said discharge causes the decomposition of the organic liquid immediately adjacent thereto, creating a small body of gas completely surrounded by said liquid. From this body globules of gas bubble through the liquid to the chamber in the electrothermic cell above the liquid, and from thence pass through the gas outlet to the gas receiver, the vaporized liquids being condensed and returned to the cell. By this method the high frequency electric discharge operates to gasify the liquid in its path, the evolved gases being immediately projected into and cooled by the liquid which is at a relatively low temperature and completely surrounds said gases. This rapid cooling of the gases reduces its temperature to a temperature under the decomposition point of acetylene, which is very important.

In further explanation of the above, it may be stated that the temperature of the arc produced by the electric discharge is over 2000° C., while the temperature of the surrounding liquid is not over 300° C. The rapid decomposition interval of acetylene begins between 700° C. and 900° C. It will thus be seen that the sudden formation of the gas by high temperature in a space or zone completely surrounded by liquid of a temperature below the decomposition point of acetylene, and the discharge of the gas, from within, through the liquid, is of special importance in this particular process.

The gas produced in this way, when petroleum hydrocarbons are used as the liquid, is a mixture containing acetylene in varying amounts, dependent largely upon the voltage and other characteristics of the electric discharge employed, as high as 35 per cent. of the total volume of gases having been produced as acetylene in my experiments. In this connection it may be explained that in my experiments I have used an electric current of from 1000 v. up to 10000 v., successfully, the alternating current being employed, and I find that when there is placed in parallel with the electrothermic cell an electric condenser (C), the discharge is more active and efficient in accomplishing the decomposition of the organic liquid and the synthesis of acetylene, and the other attendant compounds. The condenser serves to control the discharge and insure a high frequency discharge of the type that has been found most suitable for the purpose. There is also a certain amount of ethylene formed, and hydrogen constitutes about 50 per cent. of the whole volume. A small percentage of saturated hydrocarbons, such as methane, is also present. Since these attendant compounds are produced at the same time, it will be understood that where the production of acetylene is referred to, as in the claims, the production of said other compounds, or any of them, is also implied.

The following is a specific example in accordance with my method, it being understood that the invention is not limited to the particular operating conditions therein mentioned by way of illustration.

Example: The hydrocarbon used was solar oil, the temperature of which during the operation was approximately 150° C. The power input measured at the switchboard with 8 arcs in series in the liquid and a line voltage of 120 was 6.1 KW, one phase only being in operation. The amperage through the transformer (low tension side) was 67; the amperage through the high tension side being calculated as 1.3 amperes. The capacity of the condenser was .004 to .006 microfarads. The high frequency reactance comprised 7 turns. The resistance of the low tension reactance was 2.75 ohms. The amperage through the arcs (condenser discharge) was 135 amperes.

Under these conditions approximately 8.5 cubic feet of gas were obtained per hour. An approximate analysis showed:

| | |
|---|---|
| Hydrogen | 50% |
| Acetylene | 25% |
| Ethylene | 12.5% |
| Methane | 7% |
| Other hydrocarbons | 5% |

Approximately 4.5 pounds of carbon in the form of carbon-black distributed through the oil, and about 3.3 pounds of carbon in the form of electrode deposits were produced per 1,000 cubic feet of crude gas. The oil consumption was about 50 pounds per 1,000 cubic feet of gas.

A satisfactory operating frequency is about 300,000 cycles per second or higher. From the view point of the acetylene content of the gases higher frequencies are probably desirable, the limiting factor being the increased current leakage at high frequencies.

The gas formed, however, derives its chief value from the acetylene constituent, although the other gases and by-products are capable of separation and are of commercial utility and value, and the hydrogen also becomes a valuable commercial product.

The constituent gases are capable of separation for independent use, by any method or apparatus found appropriate.

Having thus fully described my said invention, what I claim as new and desire to secure by Letters Patent, is:

1. An electro-chemical method of treating organic liquids which comprises introducing within the body of the liquid a high frequency alternating-current electric arc-discharge under control, substantially as set forth.

2. A method of treating organic liquids for synthesizing acetylene which consists in introducing within a body of the liquid an alternating-current electric arc-discharge under control, substantially as set forth.

3. The method of treating organic liquids for synthesizing acetylene which consists of introducing within a body of the liquid a high potential alternating electric discharge under control, substantially as set forth.

4. The method of treating organic liquids for synthesizing acetylene which consists of introducing within a body of the liquid a high potential alternating-current electric arc-discharge, substantially as set forth.

5. The method of decomposition of organic liquid and synthesizing of acetylene comprising introducing within the body of the liquid an alternating-current electric arc-discharge under control, substantially as set forth.

6. The method of manufacture of synthetic acetylene from organic liquid comprising subjecting said organic liquid to the action of an electric arc-discharge under control, substantially as set forth.

7. The method of manufacture of acetylene from organic liquid which comprises subjecting said liquid to the action of a continuous electric power discharge under control, substantially as set forth.

8. The method of transforming organic liquid into acetylene and other attendant compounds which comprises subjecting said organic liquid to an electric discharge within the body of said liquid, permitting the gases so formed within the body of the liquid to escape through said liquid, and conducting them to a receiver, substantially as set forth.

9. The method of forming acetylene and other attendant compounds from organic liquid, which comprises submerging within the body of said liquid electrodes connected with a source of electric supply, directing an electric current across said electrodes to form a continuous electric arc discharge within the body of said liquid, and providing for the escape of the gases through said liquid, substantially as set forth.

10. The method of forming acetylene and other compounds from organic liquids which consists in depositing a quantity of such liquid in an electrothermic cell provided with electrodes connected with a source of electric current, said electrodes being submerged in said liquid, conducting a current of electricity across said electrodes creating an electric arc discharge of sufficient voltage to gasify the liquid and cause the gases to escape through the surrounding body thereof, substantially as set forth.

11. The method of forming acetylene from organic liquid, which comprises confining such liquid in a cell and introducing within the body of said liquid a constant and continuous heat discharge under control at a high temperature sufficient to decompose the liquid and synthesize acetylene, and then discharging the gas thus formed through said liquid and then conducting it to a receiver, substantially as set forth.

12. A method of treating organic liquids for synthesizing acetylene which consists in introducing within a body of the liquid a high frequency electric power-discharge, substantially as set forth.

13. A method of treating organic liquids for synthesizing acetylene which consists in introducing within a body of the liquid an arc-forming, electric, condenser-discharge, substantially as set forth.

14. An apparatus for the manufacture of synthetic acetylene from organic liquids comprising an electro-thermic cell, a source of electric current, a transformer, a circuit from said transformer to electrodes mounted within said electro-thermic cell, and a condenser interposed in said circuit for controlling the character of the discharge between said electrodes within said cell, substantially as set forth.

15. An apparatus for the manufacture of synthetic acetylene comprising an electro-thermic cell for containing organic liquid from which the gas is to be synthesized, electrodes extending from the outside through the walls of said electro-thermic cell and arranged to form an electric arc, a source of power, a circuit from said source of power to said electrodes, and a condenser interposed in said circuit for controlling the character of the electric discharge, substantially as set forth.

16. An apparatus for the manufacture of synthetic acetylene comprising an electro-thermic cell, electrodes arranged therein in position to form an electric arc, a source of power, a circuit from said source of power through said electrodes, and a condenser interposed in said circuit for controlling the character of the electric discharge, substantially as set forth.

17. An apparatus for the manufacture of synthetic acetylene comprising an electro-thermic cell, electrodes arranged therein in position to form an electric arc, a source of power, a circuit from said source of power through said electrodes, a condenser, a resistance, and a reactance interposed in said circuit for controlling the character of the electric discharge, substantially as set forth.

In witness whereof I have hereunto set my hand and seal at Pittsburgh, Pennsylvania, this 10th day of July, A. D. nineteen hundred and fifteen.

GEORGE O. CURME, Jr. [L. S.]

Witnesses:
E. W. BRADFORD,
W. J. MOORE.